United States Patent Office 3,712,806
Patented Jan. 23, 1973

3,712,806
INCREASING THE SUGAR CONTENT OF CROPS WITH α-UREIDOOXYCARBOXYLIC ACID DERIVATIVES
Henry J. Gerjovich, deceased, late of Wilmington, Del., by Dorothy J. Gerjovich, executrix, Wilmington, Del., assignor to E. I. du Pont de Nemours and Company
No Drawing. Continuation-in-part of application Ser. No. 801,170, Feb. 20, 1969, which is a continuation-in-part of application Ser. No. 657,040, July 31, 1967, both now abandoned, which in turn is a continuation-in-part of application Ser. No. 572,887, Aug. 7, 1966. This application Dec. 11, 1969, Ser. No. 884,362
Int. Cl. A01n 9/20
U.S. Cl. 71—119                                          7 Claims

ABSTRACT OF THE DISCLOSURE

The sugar content of sorghum and sugar cane can be increased by applying to the crops an effective amount of an α-ureidooxycarboxamide such as α-(ureidooxy) propionamide during the period of 10 to 60 days prior to normally scheduled harvest.

RELATED APPLICATIONS

This application is a continuation-in-part of my copending application Ser. No. 801,170 filed Feb. 20, 1969, now abandoned which is in turn a continuation-in-part of my then copending application Ser. No. 657,040, filed July 31, 1967, now abandoned, which was in turn a continuation-in-part of my then copending application Ser. No. 572,887, filed Aug. 17, 1966, now abandoned.

BACKGROUND OF THE INVENTION

This invention relates to the use of chemical compounds to increase the sugar content of sorghum and sugar cane. More specifically it is directed to the use of α-ureidooxycarboxylic acid derivatives of Formula I below, to increase the sugar content of sorghum and sugar cane by applying a compound of Formula I to be crop during the period 10 to 60 days prior to normally scheduled harvest.

Netherlands Patent No. 6,507,586 discloses use of some compounds of Formula I as post-emergence herbicides for chemical weed control. However, there is no mention in the patent of sugar-increase activity and no suggestion that the compounds be applied to sugar-containing plants 10 to 60 days prior to normally scheduled harvest.

The search for chemical agents which are useful for increasing the sugar content of sugar cane and sorghum is well documented in articles such as "Preliminary Experiments on the Effects of Chemicals on the Ripening of Sugar Cane" by R. A. Yates and J. F. Bates at pages 174–189 of the Proceedings of the 1957 Conference of the British West Indies Sugar Technologists: "A Summary of Investigations on the Possibility of Artificially Ripening Sugar Cane With Various Chemicals" by H. Evans and J. F. Bates at pages 298–307 of the 1962 Proceedings of the International Society of Sugar Cane Technologists: and "Effects of Chemicals on Ripening of Sugar Cane" by L. G. Nickell and T. T. Tanimoto at pages 152–155 of the 1965 Report of the 24th Annual Conference of Hawaiian Sugar Technologists. Yet there is no commercially successful sugar increase chemical on the market today.

I have discovered that the compounds of Formula I, when applied at the proper time to sugar cane and sorghum, result in a surprising increase in the sucrose content of the harvested plant.

SUMMARY OF THE INVENTION

In summary, this invention relates to methods of increasing the sugar content of sugar cane and sorghum comprising applying thereto from 10 to 60 days prior to normally scheduled harvest an effective amount of a compound of the formula (I)
$$H_2N-\overset{O}{\underset{}{C}}-\underset{H}{\overset{}{N}}-O-\underset{H}{\overset{R}{\underset{}{C}}}-X$$

wherein
R is hydrogen or methyl; and
X is cyano;

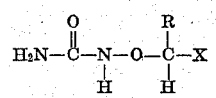

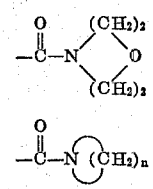

wherein $n$ is an integer of from 2 to 6;

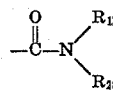

wherein $R_1$ is hydrogen, alkyl of 1 to 6 carbon atoms or alkenyl of 3 to 6 carbon atoms and $R_2$ is hydrogen, alkyl of 1 to 6 carbon atoms, alkenyl of 3 to 6 carbon atoms, cycloalkyl of 3 to 8 carbon atoms, cycloalkenyl of 5 to 8 carbon atoms, phenyl or phenyl substituted with 1 or 2 groups individually selected from halogen, methyl, methoxy, nitro or cyano.

This invention also relates to compositions useful in the practice of the above-described method of increasing the sugar content of sugar-containing crops.

The preferred compounds of Formula I for use in the methods and compositions of this invention are those in which R is methyl and X is —CN or

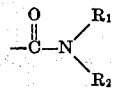

wherein $R_1$ and $R_2$ are hydrogen or alkyl of 1 to 6 carbon atoms.

DETAILED DESCRIPTION OF THE INVENTION

It has been found that when a compound of Formula I is applied to sugar cane or sorghum at the proper time during their growth, a surprising increase in the sugar content of the plant is obtained. For these crops, which are grown for sucrose production, this increase in sugar content is observed directly as an increase in the yield from a given area of cropland. While the mechanism involved in this increase in sugar content is not fully understood, it is apparent that the compounds used in this invention redirect the carbohydrate metabolism of the plant in such a way as to increase the sugar level in the plant juices.

Thus in sugar cane varieties that are prone to flower, treatment with the compounds of Formula I delays or inhibits flowering when applied at the prescribed time. In addition, the treatment results in an increase in juice purity and a decrease in the extraneous matter that must be handled at the mill when the sugar cane is harvested. Similar benefits are observed in treatment of syrup sorghum with the compounds of Formula I.

Preparation

The α-ureidooxy amides and nitriles of this invention can be prepared conveniently by the following methods illustrated by several typical examples.

1)
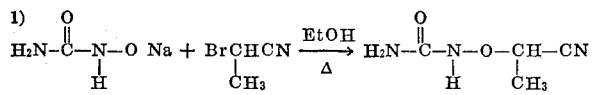

In reaction (1) it is generally best to run an alcoholic solution of the sodium salt of hydroxyurea gradually into a refluxing alcoholic solution containing the α-bromo nitrile at a rate slow enough to keep the reaction mixture as close to neutral pH as possible.

2)
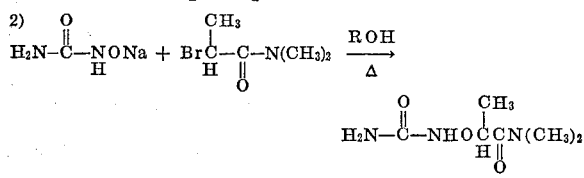

α-Bromoacyl chlorides react vigorously with amines to form amides as a general reaction. These amides react with the sodium salt of hydroxyurea much the same as the nitriles in Equation 1 above.

3)
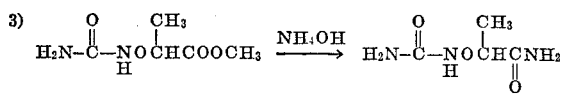

α-Ureidooxy esters react readily with concentrated aqueous ammonia or amines to form the corresponding amides. The reaction mixture is held at room temperature overnight and then the excess ammonium hydroxide or amine is removed by evaporation under reduced pressure.

4)
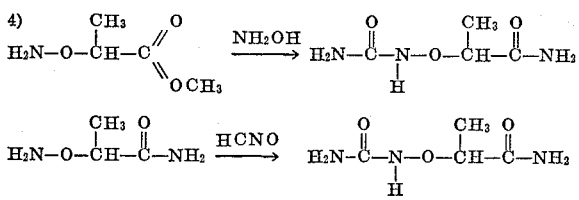

α-Aminooxy esters react readily with concentrated aqueous ammonia or amines to form the corresponding amides as in Equation 3 above. Reaction of the intermediate in water with a cyanate salt and an acid gives the α-ureidooxy amide.

Compositions

Compositions of the present invention can be prepared by admixing at least one of the compounds of Formula I with pest control adjuvants or modifiers to provide compositions in the form of solutions, water-soluble and dispersible powders, aqueous dispersions or emulsions, water extendable solutions and high-strength compositions.

Thus, the compounds can be used with carriers or diluent agents such as finely divided solid, liquids of organic origin or water, wetting agents, dispersing agents, emulsifying agents, aqueous emulsions or any suitable combination of these.

Compositions of this invention, especially liquids and wettable powders, contain as a conditioning agent one or more surface-active agents in amounts sufficient to render a given composition readily dispersible in water or in oil. By the term "surface-active agent," it is understood that wetting agents, dispersing agents, suspending agents and emulsifying agents are included.

A detailed list of suitable surface-active agents is set forth in "Detergents and Emulsifiers 1968 Annual" by John W. McCutcheon, Inc. In general, less than 10 percent by weight of the surface-active agent is present in the compositions of this invention, although usually the amount of surface-active agent in these compositions is less than 2 percent by weight. However, levels as high as 5 parts of surfactant for each part of active compound gives unusual and unexpected beneficial results. Such compositions have a greater activity than can be expected from a consideration of the activity of the components used separately.

Wettable powders

Wettable powders are water-dispersible compositions containing the active material, an inert solid extender, and one or more surfactants to provide rapid wetting and prevent heavy flocculation when suspended in water.

The inert extenders which should be used in the preferred wettable powders of this invention are preferably of mineral origin and the surfactants are preferably anionic or non-ionic. The classes of extenders most suitable for the wettable powder formulations of this invention are the natural clays, diatomaceous earth, and synthetic mineral fillers derived from silica and silicate. Among non-ionic and anionic surfactants, those most suitable for the preparation of the dry, wettable products of this invention are solid forms of compounds known to the art as wetters and dispersants. Liquid, non-ionic compounds may also serve as wetter and/or dispersant.

Most preferred fillers for this invention are kaolinites, attapulgite clay and synthetic magnesium silicate. Preferred wetting agents are alkylbenzene sulfonates and alkylnaphthalene sulfonates, sulfated fatty alcohols, amines or acid amides, long-chain acid esters of sodium isethionate, esters of sodium sulfosuccinate, sulfated or sulfonated fatty acid esters, petroleum sulfonates, and sulfonated vegetable oils. Preferred dispersants are methyl cellulose, polyvinyl alcohol, lignin sulfonates, polymeric alkylnaphthalene sulfonates, sodium naphthalene sulfonate, polymethylene bis-naphthalene sulfonate, and sodium - N - methyl - N - (long-chain acid) taurates.

Wetting and dispersing agents in these preferred wettable powder compositions of this invention are usually present at concentrations of from about 0.5 weight percent to 5 weight percent. The inert extender then completes the formulation. Where needed, 0.1 weight percent to 1.0 weight percent of the extender may be replaced by a corrosion inhibitor or an anti-foaming agent, or both.

Thus, wettable powder formulations of the invention will contain from about 20 to 90 percent active material, from 0.5 to 2.0 weight percent wetting agent, from 0.25 to 5.0 weight percent dispersant, and from 3 to 79.25 weight percent inert extender as these terms are described above.

When the wettable powder contains a corrosion inhibitor or an anti-foaming agent or both, the corrosion inhibitor will usually not exceed about 1 percent of the composition and the anti-foaming agent will usually not exceed about 0.5 percent by weight of the composition, both replacing equivalent amounts of the inert extender.

Aqueous suspensions

Aqueous suspensions are prepared by mixing together and ball-milling or sand-grinding an aqueous slurry of a water-insoluble compound of this invention the presence of dispersing agents and suspending agents to obtain a concentrated slurry of very finely divided particles in which the active ingredient is substantially all below 5 microns in size. The resulting concentrated aqueous suspension is characterized by its extremely small particle size, so that when diluted and sprayed coverage is very uniform.

Water-soluble powders

Powders also can be prepared from the water-soluble compounds of this invention. In certain cases the dry salt is dissolved in water without any other additive present and the resultant aqueous solution is sprayed on the locus to be treated. In other cases finely divided inert solid extenders and surfactants are blended with the active ingredient. The inert solid extender may be either soluble or insoluble in water. Upon extension with water the active component first disperses and then dissolves. If the inert solid extender is insoluble, it will remain in suspension to act as a tracer.

Emulsifiable oils

Emulsifiable oils are usually solutions or dispersions of active material in water-immiscible solvents, together with a surfactant. For the compounds used in this invention, emulsifiable oils can be made by mixing the active ingredient with a solvent and surfactant or by fine grinding an oil-insoluble active ingredient in the presence of the oil until the active particles are 5 microns or less in size. Suitable carriers for the compounds of this invention are hydrocarbons (substituted or unsubstituted), and water-immiscible ethers, esters, or ketones. Suitable surfactants are those anionic or non-ionic agents known to the art as emulsifying agents.

Emulsifying agents most suitable for the compositions of this invention are alkylaryl polyethoxy alcohols, alkyl polyether alcohols, polyoxyethylene sorbitol or sorbitan fatty acid esters, polyethylene glycol fatty esters, fatty alkylol amide condensates, amine salts of fatty alcohol sulfates plus long-chain alcohols, and oil-soluble petroleum sulfonates. Such emulsifying agents will comprise from about 3 to 10 weight percent of the total composition. As described above, however, up to 5 parts of emulsifying agent for each part of active compound can be used to give synergistic results.

Thus, emulsifiable oil compositions of the present invention will consist of from about 10 to 50 weight percent active material, about 47 to 87 weight percent solvent and about 3 to 10 weight percent emulsifier, as these terms are defined and used above.

Water extendable solutions

The compounds of this invention can also be formulated as solutions in such a way that when diluted with water, both the active and the carrier dissolve in the spray. For this type of formulation, the water-soluble compounds are preferred, and suitable solvents include one or more of the following: water, lower alcohols, lower ketones, dimethyl sulfoxide, dimethyl formamide, dimethyl acetamide, glycols, polyglycols, Cellosolves and the like. Such compositions usually contain from 5 to 50% active, the balance being solvent. The inclusion of surfactants is often preferred.

High-strength compositions will contain 90 to 99.5 percent active material together with 0.5 to 10 percent surfactant and 0 to 9.5 percent of anti-caking agent.

Application

It will be appreciated that the amount of a compound of Formula I that will be effective to increase the sugar content of sugar cane or sorghum will vary, for example, with the particular crop involved, plant density, the type of formulation and application method utilized, prevailing weather conditions and the particular active ingredient utilized. Since many factors are involved, it is not possible to indicate generally one rate of application which is preferred or even suitable for all situations. However, effective resolution of these factors in determining the effective amount in any given situation is well within the ability of persons of ordinary skill in the art.

Compounds of Formula I are generally applied at rates of from about 0.2 to 8.0 kilograms per hectare from 10 to 60 days prior to normally scheduled harvest, 20 to 40 days being preferred.

There follow some non-limiting examples which illustrate the preparation of compounds of the invention, their formulation into compositions suitable for application, and their use. In these examples, parts and percentages are by weight unless otherwise noted.

EXAMPLE 1

A total of 7.6 parts of hydroxyurea, 5.3 parts of sodium methoxide are combined in 50 parts by weight of methanol. This solution is added gradually to a refluxing, stirring mixture composed of 15.2 parts by weight of α-bromopropionamide and 50 parts by weight of methanol at a rate necessary to maintain the reaction at about a neutral pH. When all of the hydroxyurea solution has been added, the entire reaction is refluxed for an additional 15 minutes then evaporated to yield a residue. This residue is recrystallized from ethyl acetate to yield essentially pure α-(ureidooxy)-propionamide.

By selecting equivalent amounts of properly substituted α-bromoamides or α-bromonitrile the conditions set forth above can also be used to make the following compounds of this invention:

ureidooxyacetamide
α-(ureidooxy)-N-methylpropionamide
α-ureidooxypropionitrile
α-(ureidooxy)propionamide
α-ureidooxyacetonitrile
α-(ureidooxy)-N,N-dimethylpropionamide
α-(ureidooxy)-N-propylpropionamide
α-(ureidooxy)-N,N-diethylprionamide
α-(ureidooxy)-N-ethyl-N-methylpropionamide
α-(ureidooxy)-N-hexylpropionamide
ureidooxy-N-(o-tolyl)acetamide
α-(ureidooxy)-N-butyl-N-methylpropionamide
ureidooxy-N-cyclooctylacetamide
α-(ureidooxy)-N-cyclopent-2-enyl-N-ethylpropionamide
α-(ureidooxy)-N-(p-cyanophenyl)propionamide
α-(ureidooxy)-N,N-diallylpropionamide
α-(ureidooxy)-N-phenylprionamide
N-(ureodooxyacetyl)aziridine
N-[(α-ureidooxy)propionyl]morpholine
ureidooxy-N-hex-2-enylacetamide
α-(ureidooxy)-N-(p-chloorphenyl)-N-methylpropionamide
α-(ureidooxy)-N-cyclopropylpropionamide
α-(ureidooxy)-N-(p-methoxyphenyl)-N-butylpropionamide
N-[(α-ureidooxy)propionyl]pyrrolidine
α-(ureidooxy)-N-cyclohexyl-N-methylpropionamide
α-(ureidooxy)-N-cyclooct-2-enyl-N-methylpropionamide
ureidooxy-N-cyclohex-3-enylacetamide
α-(ureidooxy)-N-(2,4-dinitrophenyl)propionamide
N-[α-(ureidooxy)propionyl]hexahydroazepine
α-(ureidooxy)-N-p-bromophenylpropionamide
ureidooxy-N-p-fluorophenylacetamide
α-(ureidooxy)-N-(3,5-dichloorphenyl)propionamide The above compounds can also be prepared by treating the corresponding esters with an appropriate amine as described above in Equation 3.

EXAMPLE 2

α-(Ureidooxy)propionamide is dissolved in water at 0.44%, and applied on a foliar spray to sugar cane near Brisbane, Australia at the rate of 3 kilograms per hectare. Three replicates are used in this trial. The cane is eight months old at the time of treatment and growing vigorously. Four weeks after treatment the cane is harvested and the yield of sucrose per stalk is determined. The treated cane yields 68% more sucrose per stalk than the untreated controls.

The following compounds can be applied in the above manner to give similar results:

α-(ureidooxy)-N-methylpropionamide
N-(ureidooxyacetyl)aziridine
N-[(α-ureidooxy)propionyl]morpholine
α-(ureidooxy)-N-ethyl-N-methylpropionamide
α-(ureidooxy)-N,N-dimethylpropionamide
α-(ureidooxy)-N-propylpropionamide
α-(ureidooxy)-N,N-diethylpropionamide
α-(ureidooxy)-N-cyclopropylpropionamide

EXAMPLE 3

Wettable powder: Percent
α-(Ureidooxy)-N,N-diethylpropionamide _____ 30.0
Sodium alkylnaphthalenesulfonate _____ 1.0
Partially desulfonated sodium lignin sulfonate _ 2.0
Diatomaceous earth _____ 7.0
Attapulgite clay _____ 60.0

A wettable powder is formed by blending the above components, grinding in a hammer mill until substantially all the particles are below 50 microns, and then reblending to insure homogeneity.

A suspension is formed which contains one kilogram of α-(ureidooxy)-N,N-diethylpropionamide in the wettable powder formulation described above in 400 liters of water. This suspension is applied on a foliar spray on a hectare of syrup type sorghum (C. V. Waconia) when the head is tightly in the boot and about six weeks before harvest time.

When the cane is harvested, the juice expressed and syrup prepared from it, the total yield of syrup is about 15% greater from the treated area than from an adjacent untreated area of equal size.

The compounds listed below can be formulated and applied in the above manner to give similar results.

α-(ureidooxy)-N-hexylpropionamide
ureidooxy-N-(o-tolyl)acetamide
α-(ureidooxy)-N-butyl-N-methylpropionamide
ureidooxy-N-cyclooctylacetamide
α-(ureidooxy)-N-cyclopent-2-enyl-N-ethylpropionamide
α-(ureidooxy)-N-(p-cyanophenyl)propionamide
α-(ureidooxy)-N,N-diallylpropionamide
α-(ureidooxy)-N-(p-methoxyphenyl)-N-butylpropionamide
N-[α-(ureidooxy)propionyl]pyrrolidine
α-(ureidooxy)-N-cyclohexyl-N-methylpropionamide
α-(ureidooxy)-N-cyclooct-2-enyl-N-methylpropionamide
ureidooxy-N-cyclohex-3-enylacetamide
α-(ureidooxy)-N-(2,4-dinitrophenyl)propionamide
N-[α-(ureidooxy)propionyl]hexahydroazepine
α-(ureidooxy)-N-(p-bromophenylpropionamide
α-ureidooxypropionitrile
α-(ureidooxy)-N-phenylpropionamide
ureidooxy-N-hex-2-enylacetamide
α-(ureidooxy)-N-(p-chloorphenyl)-N-methylpropionamide
ureidooxy-N-p-fluorophenylacetamide
α-(ureidooxy)-N-(3,5-dichlorophenyl)propionamide Other compounds of this invention, for example, α-ureidooxypropionamide, can be similarly formulated and used.

EXAMPLE 4

Six week old syrup type sorghum plants (C. V. Tracy) growing in the greenhouse are treated at a rate of 0.5 kilograms per hectare with α-(ureidooxy)propionamide applied as a foliar spray in water containing 0.2% polysorbitan monolaurate. Five weeks later the treated plants and untreated controls are harvested. Juice is extracted from both treated and untreated plants and the total soluble solids determined. Ordinarily 90% or more of these solids are in the form of sucrose in this plant. The treated plants contained 10.5% solids while the untreated plants contained 7.4%.

Other compounds of this invention will give a similar response when applied to sorghum in a similar manner.

The following examples illustrate various methods of formulating compounds of this invention. These formulations are applied to sugar cane or sorghum as in Examples 2 through 4 and give similar results.

EXAMPLE 5

Water-extendable solution: Percent
A-Ureidooxypropionitrile _____ 30.0
Dimethylformamide _____ 70.0

These ingredients are mixed until the α-ureidooxypropionitrile has dissolved.

The resulting solution is extended with water to yield 3 kilograms of active ingredient in 250 liters. The suspension is applied to one hectare of sugar cane as in Example 2 and similar results are observed.

EXAMPLE 6

Water-soluble powder: Percent
α-(Ureidooxy)-N-methylpropionamide _____ 50.0
Alkylnaphthalene sulfonic acid, Na salt _____ 1.0
Sodium naphthalene sulfonic acid _____ 2.0
Sodium bicarbonate _____ 47.0

The above ingredients are blended and ground.

The resulting powder is dispersed in water at the rate of 6.0 kilograms in 50 liters. Fifty liters of this suspension are sprayed on a hectare of sugar cane as in Example 2 and similar results are observed.

EXAMPLE 7

Wettable powder: Percent
α-(Ureidooxy)-N,N-dimethylpropionamide __ 50.0
Oleic acid ester of sodium isethionate _____ 4.0
Neutral synthetic magnesium silicate _____ 46.0

The above ingredients are blended and ground until substantially all particles are below 50 microns.

Eight kilograms of the resulting wettable powder is diluted with 90 liters of water and sprayed on a hectare of sugar cane as in Example 2 and similar results are obtained.

EXAMPLE 8

Aqueous suspension: Percent
α-(Ureidooxy) - N-(p - methoxyphenyl)-N-butylpropionamide _____ 30.00
Sodium lignin sulfonate _____ 15.00
Hydrated attapulgite _____ 1.75
Dioctyl sodium sulfosuccinate _____ 1.00
Water _____ 52.25

An aqueous suspension is prepared by first mixing and sand-grinding together all of the components except the dioctyl sodium sulfosuccinate and enough water to prepare a concentrated solution of this wetting agent. When the product has been ground until the active ingredient is substantially all below 5 microns, grinding is discontinued and the solution of wetting agent added. The product is characterized by its extremely small particle size and low surface tension so that when diluted and sprayed, the plant foliage is very uniformly coated.

Three kilograms of the aqueous suspension is suspended in 280 liters of water and applied to sorghum as in Example 3 to give similar results.

EXAMPLE 9

Emusifiable oil: Percent
Ureidooxyacetamide _____ 20.0
Alkylaryl polyether alcohol _____ 5.0
Xylene _____ 75.0

The above ingredients are mixed and sand-ground until the particle size is less than 5 microns. The resulting oil can be emulsified with water or extended with additional oil for application.

Fifteen kilograms of this emulsifiable formulation is emulsified in water and sprayed on a hectare of sugarcane as in Example 2 with similar results.

EXAMPLE 10

| Dispersible powder: | Percent |
|---|---|
| Ureidooxyacetonitrile | 50 |
| Sodium N-methyl-N-palmitoyl taurate | 2 |
| Kaolin clay | 48 |

The above components are blended and then micropulverized. Upon extension with water the active component first disperses and then dissolves, leaving the clay in suspension to act as a tracer for indication of coverage when sprayed.

One kilogram of the powder is extended with 550 liters of water and sprayed on a hectare of syrup sorghum as in Example 3 to produce a similar response.

EXAMPLE 11

| Aqueous solution: | Percent |
|---|---|
| Ureidooxyacetamide | 10 |
| Water | 90 |

The above components are combined, warmed and stirred.

Three kilograms of the resulting solution is added to 50 liters of water and sprayed on a hectare of syrup-type sorghum as in Example 3 and similar results are obtained.

EXAMPLE 12

| Soluble powder: | Percent |
|---|---|
| α-Ureidooxy-N,N-dimethylacetamide | 95 |
| Alkylaryl polyethylene glycol ether | 1 |
| Synthetic silica | 4 |

The above components are blended and micropulverized to pass a USS 60-mesh (0.25 mm.) screen. The resulting formulation is useful in the preparation of other types of formulation, but can also be used directly.

Four kilograms of α-(1-methylureidooxy)propionic acid formulated as described above, is added to water and diluted to 360 liters. One-half percent of a non-phytotoxic wetting agent is added and the solution sprayed on a hectare of sugar cane as in Example 2 to give similar results.

What is claimed is:

1. A method for increasing the sugar content of sugar cane and sorghum crops comprising applying thereto from 10 to 60 days prior to normally scheduled harvest an effective amount of a compound of the formula

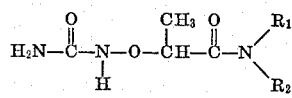

wherein each of $R_1$ and $R_2$ independently can be hydrogen or alkyl of 1 to 6 carbon atoms.

2. The method of claim 1 wherein the compound is α-(ureidooxy)propionamide.

3. The method of claim 1 wherein the compound is α-(ureidooxy)-N-methylpropionamide.

4. The method of claim 1 wherein the compound is α-(ureidooxy)-N,N-diethylpropionamide.

5. The method of claim 2 wherein the compound is applied from 20 to 40 days prior to normally scheduled harvest.

6. The method of claim 3 wherein the compound is applied from 20 to 40 days prior to normally scheduled harvest.

7. The method of claim 4 wherein the compound is applied from 20 to 40 days prior to normally scheduled harvest.

References Cited

UNITED STATES PATENTS 3,457,063   7/1969   Neighbors _____ 71—106 X

JAMES O. THOMAS, JR., Primary Examiner

U.S. Cl. X.R.

71—88, 94, 95, 105